United States Patent [19]

Mims

[11] Patent Number: 5,244,308

[45] Date of Patent: Sep. 14, 1993

[54] APPARATUS FOR REMOVING CONTAMINANTS

[75] Inventor: Ken Mims, Lake Monroe, Fla.

[73] Assignee: Uddo-Mims International, Inc., Edgewater, Fla.

[21] Appl. No.: 888,174

[22] Filed: May 26, 1992

Related U.S. Application Data

[63] Continuation-in-part of Ser. No. 699,218, May 13, 1991, which is a continuation-in-part of Ser. No. 563,813, Aug. 3, 1990, which is a continuation of Ser. No. 443,465, Nov. 8, 1989, abandoned, which is a continuation of Ser. No. 316,933, Feb. 27, 1989, abandoned, which is a continuation of Ser. No. 110,111, Oct. 19, 1987, Pat. No. 4,818,419, which is a continuation-in-part of Ser. No. 714,034, Mar. 20, 1985, Pat. No. 4,707,277.

[51] Int. Cl.$^5$ .............................................. B09B 3/00
[52] U.S. Cl. .................................. 405/128; 134/25.1; 405/263
[58] Field of Search ............... 405/128, 129, 258, 263; 134/25.1, 40; 210/747, 767, 773, 170

[56] References Cited

U.S. PATENT DOCUMENTS

| | | | |
|---|---|---|---|
| 4,919,570 | 4/1990 | Payne | 405/128 |
| 4,969,775 | 11/1990 | Cappel et al. | 405/128 |
| 4,993,873 | 2/1991 | Tippmer | 405/128 |
| 5,039,415 | 8/1991 | Smith | 210/747 X |
| 5,098,224 | 3/1992 | Netzel et al. | 405/128 |
| 5,143,481 | 9/1992 | Schumacher et al. | 405/129 |
| 5,152,844 | 10/1992 | Wilwerding | 134/25.1 |

Primary Examiner—David H. Corbin
Attorney, Agent, or Firm—Frijouf, Rust & Pyle

[57] ABSTRACT

An apparatus and method is disclosed for an improved mobile apparatus for removing contaminants from a site containing granular material with the contaminants being affixed thereto. The mobile apparatus comprises a processor which extracts the granular material containing the contaminants from the site. The processor containing a liquid agent separates the contaminants from the granular material and creates a slurry comprising the granular material, the liquid agent and the contaminants. A conduit conducts the slurry from the processor to a mobile reservoir. A separator extending angularly relative to the mobile reservoir conveys the granular material, the liquid agent and the contaminants away from the mobile reservoir and separates the granular material from the liquid agent containing the contaminants.

20 Claims, 4 Drawing Sheets

APPARATUS FOR REMOVING CONTAMINANTS

CROSS-REFERENCE TO RELATED APPLICATIONS

This is a continuation-in-part of application Ser. No. 699,218 filed May 13, 1991. Application Ser. No. 699,218 filed May 13, 1991 is a continuation-in-part of application Ser. No. 563,813 filed Aug. 3, 1990 which is a continuation of application Ser. No. 443,465 filed Nov. 8, 1989, now abandoned. Application Ser. No. 443,465 filed Nov. 8, 1989 is a continuation of application Ser. No. 316,933 filed Feb. 27, 1989, now abandoned. Application Ser. No. 316,933 filed Feb. 27, 1989 is a continuation of application Ser. No. 110,111 filed Oct. 19, 1987, now U.S. Pat. No. 4,818,419. Application Ser. No. 110,111 filed Oct. 19, 1987 is a continuation-in-part of application Ser. No. 714,034 filed Mar. 20, 1985, now U.S. Pat. No. 4,707,277. All subject matter of application Ser. No. 563,813 filed Aug. 3, 1990, application Ser. No. 443,465 filed Nov. 8, 1989, application Ser. No. 316,933 filed Feb. 27, 1989, application Ser. No. 110,111 filed Oct. 19, 1987, and application Ser. No. 714,034 filed Mar. 20, 1985 is incorporated by reference as if fully set forth herein.

BACKGROUND OF THE INVENTION

1. Field Of The Invention

This invention relates to a method and an apparatus for removing contaminants from a site containing granular material containing the contaminants being affixed thereto. More specifically, the invention relates to a method and an apparatus for the on-site removal of contaminants from sand and soil and returning of the cleaned sand and soil to the site.

2. Information Disclosure Statement

Chemicals have become an important part in our society and have become prevalent in our environment. In many cases in the past, disposal of these chemicals did not receive the proper attention. As a result, many instances can be found where these past disposal practices, or mere carelessness, have led to environmental pollution which must be addressed at the present time. One very common environmental pollution is the pollution of the soil.

Soil pollution can occur from a variety of sources. At chemical dumps, containers of contaminants have been buried in the ground. Over a period of time, some of the containers may have ruptured resulting in the percolation of the contaminants into the soil. At electrical battery assembly plants, lead may have contaminated the soil. Other industrial activities have left oil, toxic chemicals and other undesirable compounds in the soil. Old gasoline stations have underground storage tanks which may have leaked gasoline into the earth. Oil spills at sea have fouled beaches and shorelines on virtually every continent. Because of these problems, developing an efficient method of cleaning the earth of the pollution is both socially desirable and commercial viable.

The current method for cleaning contaminated soil involves excavating the site, loading the soil and contaminants into containers, and moving the containers to a plant for processing. New, clean soil is deposited at the site to replace the old soil.

These methods have proved to be effective techniques for cleaning contaminated sites and removing pollutants from the site. However, while these methods have been effective in removing the contaminants, these methods are not particularly efficient. These methods rely primarily on massive earth removal including the excavation and moving of the entire volume of soil and contaminants from the site. This may require the transportation of large volumes of earth over great distances, depending on the location of the processing plant. Numerous vehicles, workers and time are required to accomplish this task. Such an earth moving project is therefore expensive because of the resources needed to undertake the project. In addition, these projects are time consuming because of the numerous vehicle and trips required to transport the large volumes of earth.

The multiple trips increase the danger of an environmental spill or other accident harmful to person or property. Additional damage is effected to collateral resources, such as increasing the wear and tear on the roads and the like.

Therefore, it is an object of the present invention to provide a method and an apparatus for removing contaminants from a granular material which removes the contaminants from the granular material without the need for transporting the granular material from the site.

Another object of the present invention is to provide a method and an apparatus for removing contaminants from a granular material in which the excavated soil is cleaned at the site and returned to the ground and only the contaminants are removed from the site for disposal.

Another object of the present invention is to provide a method and an apparatus for removing contaminants from a granular material utilizing a mobile processor means.

Another object of the present invention is to provide a method and an apparatus to remove contaminants from granular material which is mobile and completely self-contained.

Another object of the present invention is to provide a method and an apparatus for removing contaminants from a granular material which are more efficient than previous methods.

Another object of the present invention is to provide a method and an apparatus for removing contaminants from a granular material which is less expensive than previous methods.

Another object of the present invention is to provide a method and an apparatus for removing contaminants from a granular material which is less time consuming than previous methods.

Another object of the present invention is to provide a method and an apparatus for removing contaminants from a granular material which is safer for person, property and the environment than previous methods.

Another object of the present invention is to provide a method and an apparatus for removing contaminants from a granular material which is less destructive of collateral resources than previous methods.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus for removing contaminants from a site containing granular material with the contaminants being affixed thereto, utilizing a liquid agent. The apparatus comprises processor means for extracting at least a portion of the granular material with the contaminants being affixed thereto from the site. The processor means contains the liquid agent for separating the contaminants from the granular material for creating a slurry comprising the granular material and the liquid agent containing the contaminants. The processor means has an output port for conducting the slurry from the processor means to an inlet of a mobile reservoir means. A separation means has a first opening and a second opening with the first opening being in fluid communication with the outlet of the mobile reservoir means. The separation means extends angularly relative to the mobile reservoir means for conveying the granular material, the liquid agent and the contaminants away from the first opening toward the second opening for allowing the liquid agent and the contaminants to drain back toward the first opening to separate the granular material from the liquid agent and the contaminants. A discharge means is in fluid communication with the mobile reservoir means for discharging the liquid agent and the contaminants from the mobile reservoir means.

Preferably, the mobile reservoir means defines a chamber having opposed sloping sidewalls which slope toward each other from the inlet to the outlet such that as the granular material, the liquid agent and the contaminants enter the mobile reservoir means through the inlet, turbulent energy of the granular material, the liquid agent and the contaminants is rapidly dissipated permitting the granular material to settle toward the outlet. The mobile reservoir means may include weir means extending into the chamber for permitting the level of the slurry within the chamber to be limited. An accumulator means is disposed between the weir means and the discharge means for accumulating the liquid agent and the contaminants without the granular material. The accumulator means has an entry port and an exit port with the entry port being in fluid communication with the weir means for permitting the slurry to flow from the weir means to the accumulator means. A first flexible pipe extends between the exit port of the accumulator means and the discharge means whereas a second flexible pipe extends from the discharge means to the basin for enabling the slurry to be discharged from the accumulator means.

In one embodiment of the invention, the separator includes an Archimedean screw conveyor for separating the granular material from the liquid agent and the contaminants.

The invention is also incorporated into the method of removing contaminants from a site comprising the steps of transporting the mobile apparatus to the site and extracting at least a portion of the granular material and the contaminants being affixed thereto from the site. The granular material and the contaminants are processed such that the contaminants are separated from the granular material creating a slurry of the granular material, the liquid agent and the contaminants. The slurry flows through a mobile reservoir means to enable the granular material within the mobile reservoir means to settle toward an outlet of the mobile reservoir. A separator means having a first and a second end opening conveys the granular material toward the second end opening of the separation means while allowing the liquid agent and the contaminants to drain back toward the first opening to separate the granular material from the liquid agent and the contaminants.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception of the specific embodiment disclosed may be readily utilized as a basis for modifying or designing other apparatus for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DISCUSSION

Figure 1:
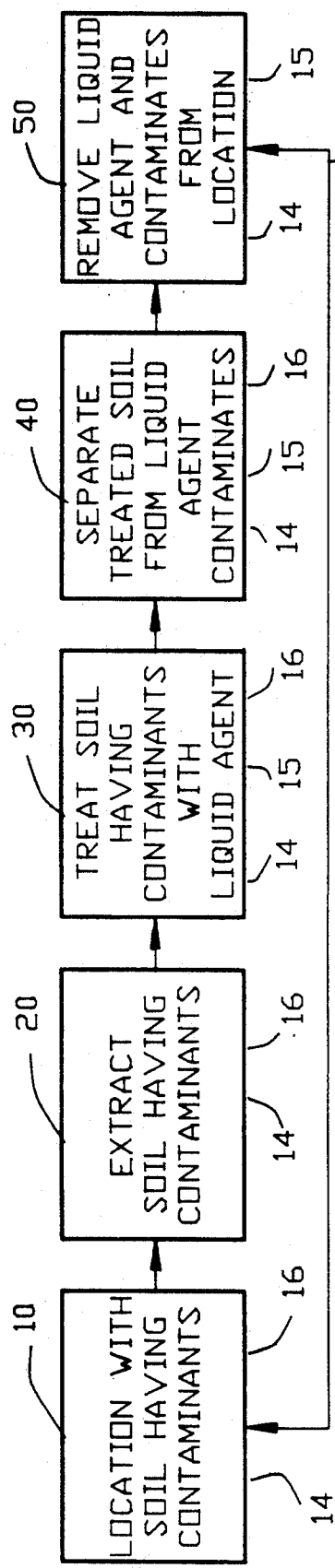
FIG. 1 is a block diagram of the process for removing contaminants from a granular material according to the present invention.
Figure 2:
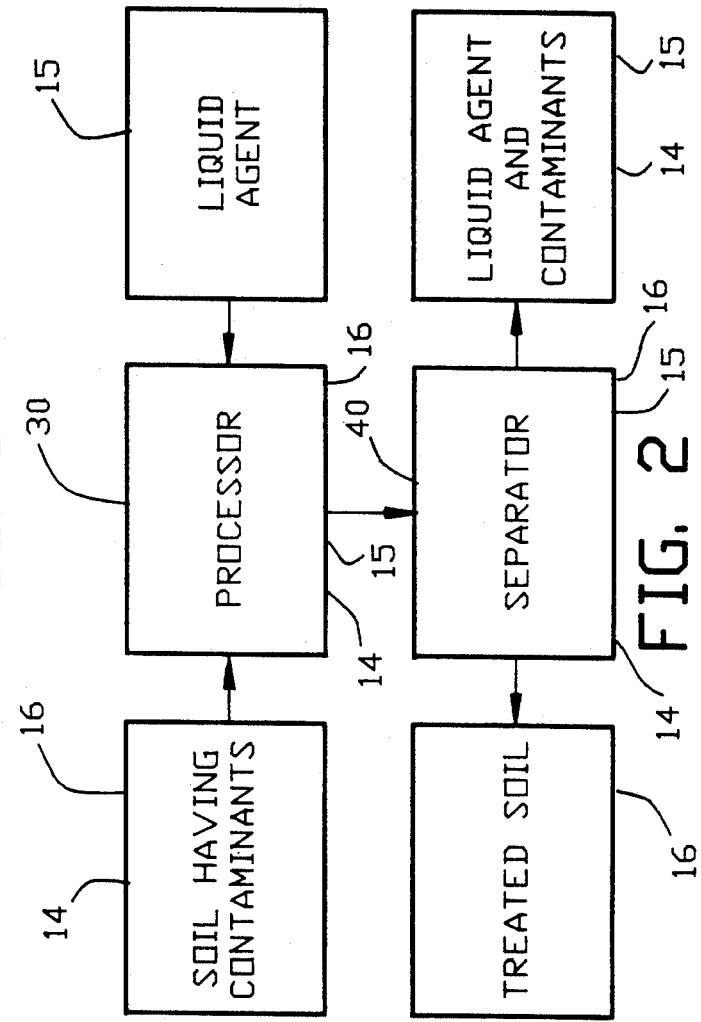
FIG. 2 is a block diagram of the apparatus for removing contaminants from a granular material according to the present invention.
Figure 3:
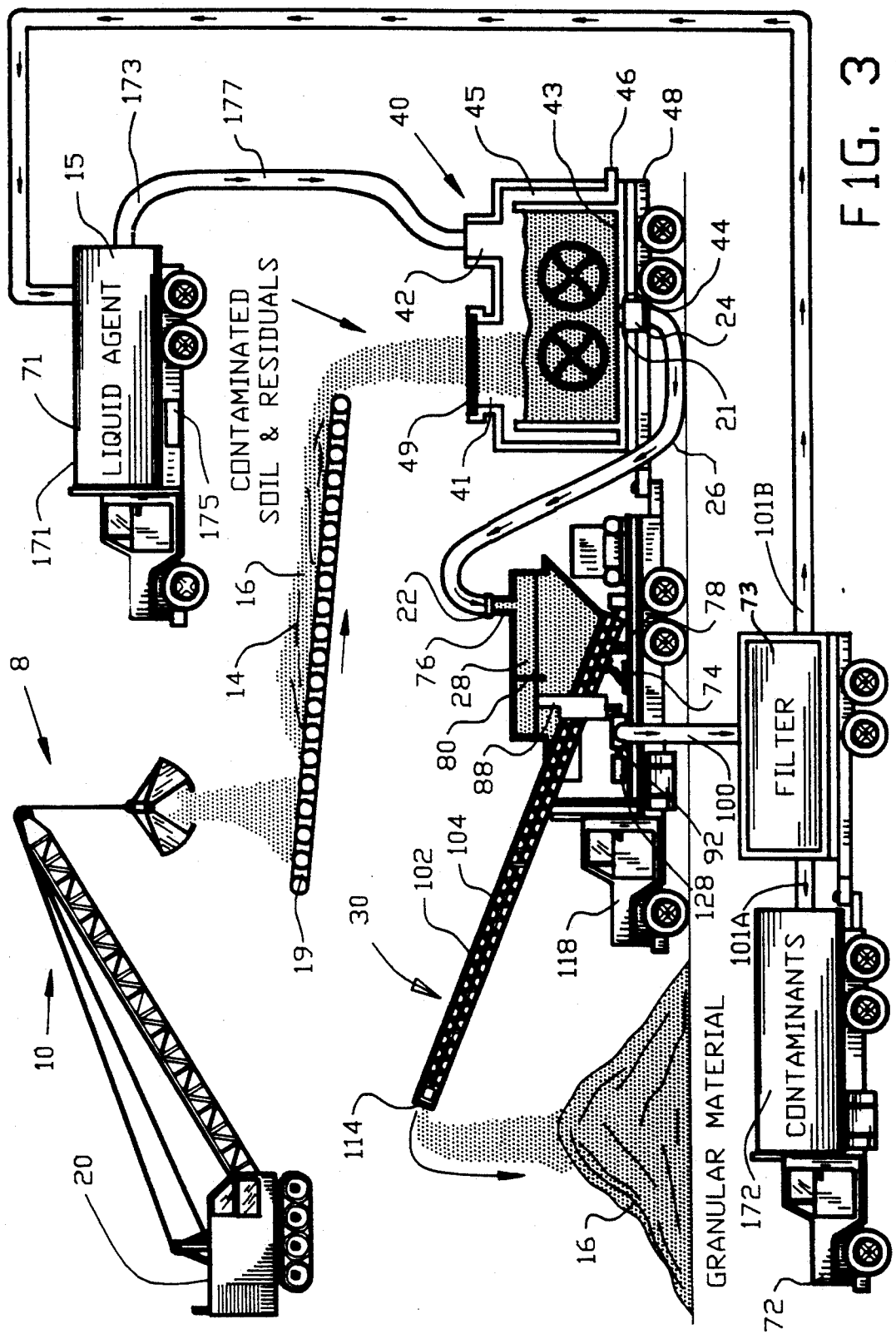
FIG. 3 is a diagrammatic representation of the process of the apparatus of the present invention.

FIGS. 1 and 2 are block diagrams of the process and apparatus of the present invention for removing contaminants 14 from a site 10. FIG. 3 is a diagrammatic representation partly in section of the mobile apparatus 8 of the present invention. The site 10 is filled with a granular material 16 which may be sand, grit or other solid particulate material with the contaminants 14 being affixed to the granular material 16. The site 10 may constitute previously undisturbed soil, or a stockpile previously gathered for the purpose of processing.

Excavation means shown as a clam shell crane 20 is positioned proximate to the site 10. It is understood that excavation means may alternatively be a track hoe, a front end loader, or other type of earth moving equipment. Additionally, a wet vacuum arrangement may be employed using an injection hose (not shown), pump (not shown) and an extraction nozzle (not shown). In this embodiment, the clam shell crane 20 deposits the granular material 16 containing the contaminants 14 on a conveyor 19.

A chemical input means is shown as a first tank truck 71 but may comprise any type of mobile container suitable for transporting a liquid. The first tank truck 71 contains a liquid agent 15 for treating the granular material 16 and the contaminants 14. The liquid agent 15 may be a biodegradable, enzyme enriched stripping solution, an emulsifying agent, or other active chemical agent in liquid form that would react with the particular contaminant 14 to be removed from the site 10. For example, if the contaminate 14 to be removed is oil, then the liquid agent 15 may be an oil-eating enzyme. If contaminant 14 is lead, then the liquid agent 15 may be a chemical compound which reacts with lead. A first tank 171 is mounted on the first tank truck 71 and has a first tap 173 and a first tank pump 175 for pumping the liquid agent 15 from first tap 173 of the first tank 171 through a first hose 177.

Figure 4:
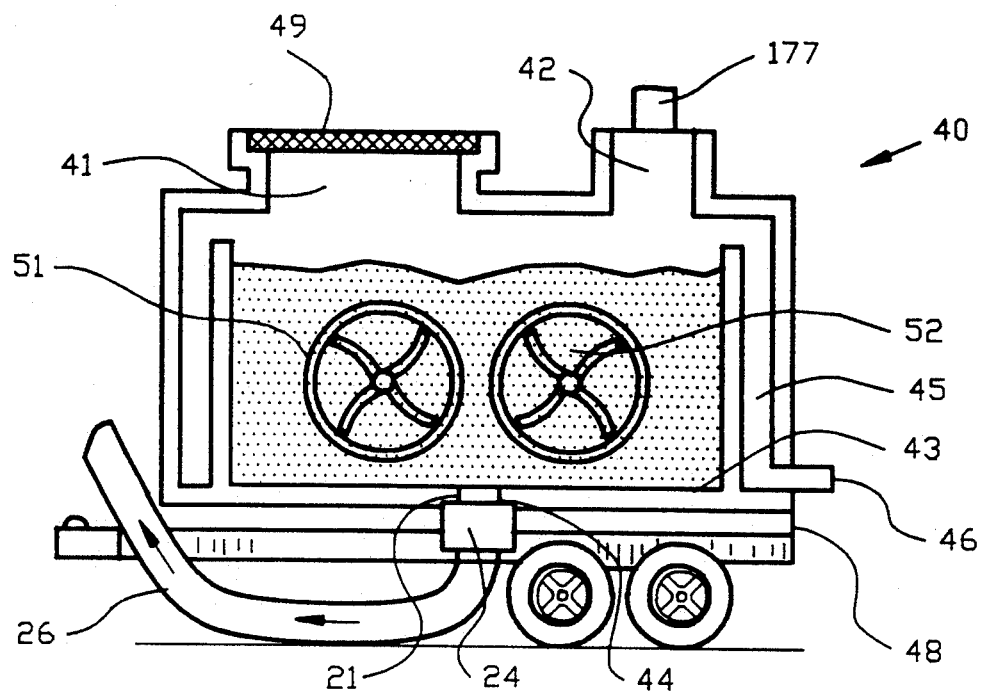
FIG. 4 is an enlarged fragmentary view partially in section of the processor means shown in FIG. 3.

As illustrated in FIG. 3, and in greater detail in FIG. 4, a processor means 40 is shown as a variable speed fluid stripping chamber, but may also take other forms such as a cyclone separator. The processor 40 comprises a first input port 41 and a second input port 42. A filter screen 49 is mounted on first input port 41 of the processor 40. Although many types of filter screen may be used, the filter screen is shown as a vibrator actuated scalper bar screen 49. The second input port 42 is connected to the first hose 177 to be in fluid communication with the first tank 171.

As shown in FIG. 4, the processor 40 further comprises a basin 43, an output port 44, a sump 45, and a sump tap 46. Mechanical mixing means is shown as variable speed first and second agitators 51 and 52, respectively. Processor 40 is mounted on mobile means shown as a trailer 48.

A conduit means 26 has a conduit first end 21 and a conduit second end 22 with the conduit first end 21 being in fluid tight communication with output port 44 of the processor 40. A slurry pump 24 is interposed in the conduit 26. It is understood that conduit means may alternatively comprise a screw auger (not shown) or other such device for conveying mixtures of solids and liquids.

Figure 5:
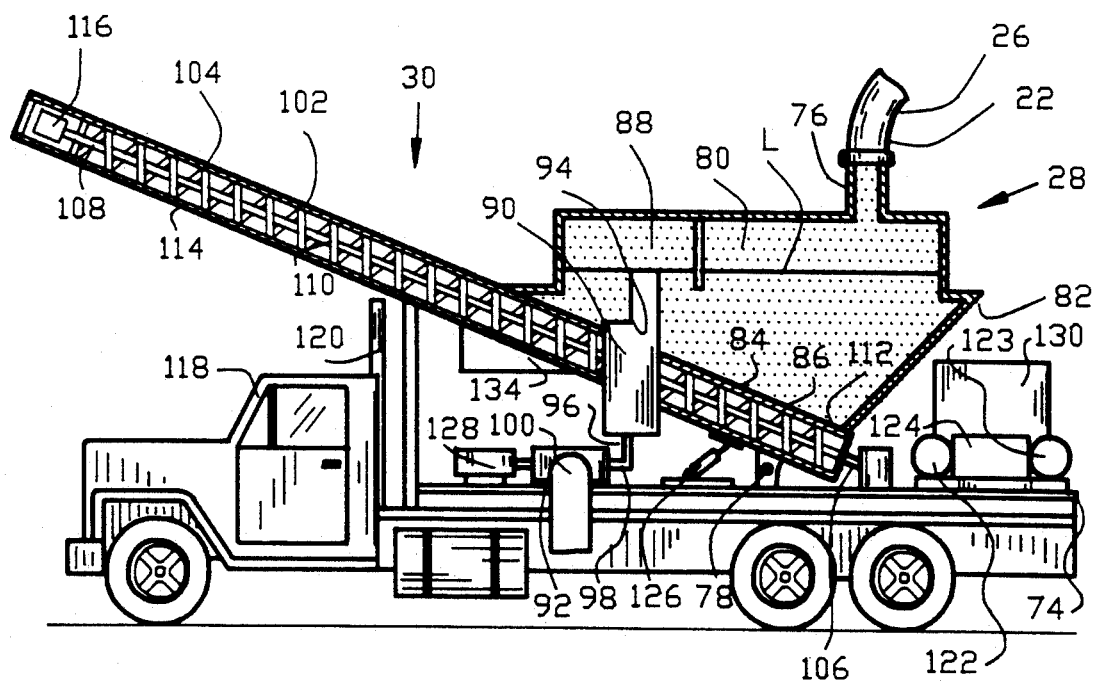
FIG. 5 is an enlarged fragmentary view partially in section of the mobile reservoir means and the separation means shown in FIG. 3.

As shown in FIG. 3, and in greater detail in FIG. 5, a mobile reservoir means 28 includes a mobile turntable 74 for permitting the mobile reservoir 28 to be rotated within a substantially horizontal plane such that an inlet 76 of the mobile reservoir 28 is selectively positioned adjacent to the site 10 and the processor 40. A pivotal means 78 is disposed between the mobile turntable 74 and the mobile reservoir 28 such that the mobile reservoir 28 is selectively positioned angularly relative to the mobile turntable 74. The inlet 76 is connected in fluid tight communication with the conduit second end 22 of the conduit 26. The mobile reservoir 28 also defines a chamber 80 which includes opposed sloping side walls 82 and 84 respectively which slope towards each other from the inlet 76 to an outlet 86 of the mobile reservoir 28. As the slurry 18 enters the mobile reservoir 28 through the inlet 76, turbulent energy of the granular material 16, the liquid agent 15, and the contaminants 14 of the slurry 18 is rapidly dissipated permitting the granular material 16 to settle towards the outlet 86. Weir means 88 extends into the chamber 80 for limiting the level L of the slurry 18 within the chamber 80. An accumulator means 90 is disposed between the weir means 88 and a second pump means 92 for accumulating the slurry 18 without the granular material 16. The second pump means 92 is driven by a second motor 128. The accumulator means 90 includes an entry port 94 and an exit port 96, respectively. The entry port 94 is connected to the weir means 88 for permitting the slurry 18 from the weir means 88 to flow to the accumulator means 90. A first flexible pipe 98 extends from the exit port 96 of the accumulator means 90 to the second pump means 92. A second flexible pipe 100 extends from the second pump means 92.

Disposal means is shown as a second tank truck 72 and an optional filter trailer 73 for filtering the contaminants 14 from the liquid agent 15 and for transporting the contaminants 14 away from the site 10. Alternatively, the disposal means may comprise a tank trailer (not shown) or other type of mobile container suitable for transporting the contaminants 14. A second tank 172 is mounted on the second tank truck 72 and has a second tap 174. The second flexible pipe 100 connected from the accumulator means 90 enters the filter trailer 73 to separate the contaminates 14 from the liquid agent 15. A flexible pipe 100A conducts the contaminates 14 and contaminated liquid agent 16 into the second tap 174 of the mobile reservoir tank 172 of the second tank truck 72. Non-contaminated liquid agent 15 is conducted through a flexible pipe 100B back to the first tank 171. Accordingly, the non-contaminated liquid agent 15 may be reused in the process. In the event that the contaminates 14 and the liquid agent 16 are of such a nature that the liquid agent 16 cannot be reused, then the filter trailer 73 is eliminated and the contaminates 14 and the liquid agent 16 are conducted through the flexible pipe 100A directly into the second tap 174 of the mobile reservoir tank 172 of the second tank truck 72.

Separator means 30 is shown as an Archimedean screw conveyor including an elongate housing 102 defining a first opening 112 and a second opening 114. The first opening 112 of the elongate housing 102 is disposed adjacent to and in fluid communication with the outlet 86 of the mobile reservoir 28. The elongate housing 102 extends angularly relative to the mobile reservoir 28 at an angle of substantially 18 degrees the horizontal. The mobile turntable 74 permits the separator means 30 to be rotated within a substantially horizontal plane such that the second opening 114 of the elongate housing 102 may be selectively positioned to expel cleaned granular material 16 at a desired location such as on the surface of the ground or into a bed of a dump truck (not shown). An elongate axle 104 is rotatably supported by and extends through and along the length of elongate housing 102. The elongate axle 104 includes a first and a second end 106 and 108, respectively, with the first end 106 of the elongate axle 104 being disposed adjacent to the outlet 86 of the mobile reservoir 28. A spiral conveyor means 110 is rigidly secured to the elongate axle 104 such that the spiral conveyor means 110 is disposed within the elongate housing 102. The spiral conveyor means 110 extends between the first and second openings 112 and 114, respectively, of the elongate housing 102. The separator means 30 also includes a hydraulic motor 116 which is drivingly connected to the second end 108 of the elongate axle 104. The hydraulic motor 116 is driven by a hydraulic pump 123 and a first motor 124. When the elongate axle 104 and the spiral conveyor means 110 rotate within the elongate housing 102, the granular material 16, the liquid agent 15, and the contaminants 14 are conveyed upwardly along the elongate housing 102 from the first opening 112 toward the second opening 114. The granular material 16 continues upwardly until discharged from the second opening 114. The liquid agent 15 and the contaminants 14 separated from the granular material 16 flow downwardly along the elongate housing 102 towards the first opening 112.

A truck 118 rotatably supports the separator means 30 enabling the second opening 114 of the elongate housing 102 to be rotatably disposed away from the truck 118 for enabling the discharged granular material 16 to be loaded into a dump truck or the like (not shown). A support means 120 is secured to the truck 118 for releasably supporting the elongate housing 102 relative to the truck 118. An air compressor 130 is secured to the truck 118 for supplying compressed air to an air accumulator 122. The first motor 124 drives the first air compressor 130 which supplies compressed air to the air accumulator 122. The air accumulator 122 supplies compressed air for operating the pumps or other equipment.

A control box 134 includes a plurality of control levers (not shown) for controlling selectively the operation of a hydraulic cylinder 126 for selectively positioning the mobile reservoir 28 and the elongate housing 102 angularly relative to the mobile turntable 74. The control box 134 also controls other equipment by suitable pneumatic and hydraulic control circuitry as well known to those skilled in the art. The control box 134 also includes manual control levers for controlling the second pump means 92 and the hydraulic motor 116 for rotating the spiral conveyor means 110. The first motor 124 drives both the air compressor 130 and hydraulic pump means 123 for operating various hydraulic components.

In the preferred embodiment of the present invention, the elongate housing 102 has a square transverse configuration thereby allowing ample room for the accommodation of hydraulic conduits (not shown) therein for powering the hydraulic motor 116. In the preferred form of the present invention, the second motor 128 is rated at 5 horsepower and the hydraulic motor 116 is capable of producing 25-35 horsepower motor for rotating the spiral conveyor means 110. The second pump means 92 is of the type having a maximum flow capacity of 280 gallons per minute. The Archimedean screw conveyor is 14 inches (35.56 cm) in diameter with the individual flights of the spiral conveyor means 110 having a spacing of 7 inches (17.78 cm). The length of the elongate housing 102 is 15 feet (4.57 m) such that the granular material 16 discharged from the second opening 114 has a 20% moisture content after draining when the spiral conveyor means 110 rotates at approximately 12 revolutions per minute. As will be appreciated from the foregoing, the time taken for the removed granular material 16 to travel from the first opening 112 to the second opening 114 is approximately 2-3 minutes.

The first motor 124 is a diesel motor which drives the air compressor 130 for supplying compressed air at approximately 150 pounds per square inch to the air accumulator 122. The diesel engine 124 is rated at approximately 150 horsepower in the preferred embodiment.

The mobile apparatus 8 operates under the following method of operation. First, the mobile apparatus 8 including the excavation means 20, the first tank truck 71 containing the liquid agent 15, the trailer 48 and processor 40, the truck 118 supporting the mobile reservoir 28 and the separator means 30 are moved to the site 10. The second tank truck 72 and the optional dump truck (not shown) for receiving and removing granular material 16 are likewise moved to the site. The clam shell crane 20 and the processor 40 are positioned proximate to the granular material 16 and the contaminants 14 within the site 10.

The mobile apparatus 8 is assembled in fluid tight communication as described above including the first hose 171 connecting the first tap 173 of the first tank truck 71 to the second input port 42 of the processor 40. The conduit 26 connects the output port 44 of the processor 40 to the inlet 76 of the mobile reservoir 28. The second flexible pipe 100 connects the second pump means 92 through the filter trailer 73 to the second tap 174 of the second tank 172 of the second tank truck 72.

As shown in FIGS. 3 and 4, the liquid agent 15 is pumped from the first tank 171 of the first tank truck 71 through the first tap 173, the first hose 177 and the second input port 42 into the processor 40. If the topography of the site 10 permits, the liquid agent 15 may alternatively be gravity fed from the first tank truck 71 to the processor 40.

The clam shell crane 20 or other excavation means excavates the granular material 16 and the contaminants 14 from the site 10 onto the conveyor 19 and deposits the granular material 16 and the contaminants 14 on the filter screen 49 mounted on the first input port 41 of the processor 40. The filter screen 49 prevents the passage of large objects into the processor 40. The granular material 16 and the contaminants 14 are allowed to pass through the filter screen 49 into the first input port 41 of the processor 40 and drop by gravity into the basin 43 of the processor 40. Alternatively, a wet vacuum arrangement may be employed wherein the liquid agent 15 is injected directly into the site 10 through an injection hose (not shown). In such an embodiment, the resultant mix of the granular material 16, the liquid agent 15 and the contaminants 14 are extracted from the site 10 through an extraction nozzle (not shown).

The basin 43 of the processor 40 receives the granular material 16 and the contaminants 14 through the first input port 41 and receives the liquid agent 15 from the first tank truck 71 through the second input port 42.

The first and second agitators 51 and 52 thoroughly mix the granular material 16 and the contaminant 14 attached thereto with the liquid agent 15. Preferably, the liquid agent 15 acts as both a reactive agent and a transportation medium. The liquid agent 15 reacts with the contaminants 14 thereby stripping the contaminants 14 from the granular material 16 and brings the contaminants 14 into a solution. The chemical or physical action that causes the separation of the contaminants 14 from the granular material 16 depends on the type of the contaminants 14 to be removed from the site 10. The reaction may involve a chemical reaction in which the liquid agent 15 chemically reacts with the contaminants 14 to form a new compound which no longer adheres to the granular material 16. Alternatively, the reaction may involve a cleaning process through an emulsion process wherein the liquid agent 15 acts as an emulsifying agent causing the contaminants 14 to dissolve in the liquid agent 15. The mechanical separation may alternatively be employed in another type of processor such as a cyclone separator (not shown) in which case massive particles are separated from less massive particles by centrifugal force. The action of the agitators 51 and 52 also creates a slurry 18 comprising the granular material 16, the liquid agent 15 and the contaminants 14.

As shown in FIGS. 3 and 5, the slurry pump 24 pumps the slurry 18 of the granular material 16, the liquid agent 15, and the contaminants 14 from the output port 44 of the processor 40 through the conduit 26 to the inlet 76 of the mobile reservoir 28. Alternatively, the processor 40 may be mounted or positioned at an elevation greater than the elevation of the mobile reservoir 28 such that the slurry 18 is gravity-fed from the processor 40 to the mobile reservoir 28. The slurry 18 is discharged into the chamber 80. Due to the sloping configuration of the mobile reservoir 28, turbulent energy of the slurry 18 is rapidly dissipated and the granular material 16 quickly settles to the bottom of the mobile reservoir 28 toward the outlet 86 of mobile reservoir 28, outlet 86 being in fluid communication with a first opening 112 of the elongate housing 102. The sump tap 46 may be used to drain solid or liquid matter from the sump 45.

The separator means 30 then separates the granular material 16 from the liquid agent 15 and the contaminants 14. As the granular material 16 settles towards the first opening 112 of the elongate housing 102, the spiral conveyor means 110 is rotated to convey the granular material 16, the liquid agent 15 and the contaminant 14 angularly upwards toward the second opening 114. An angle of 18° to the horizontal has been found to be the optimum angle for separating the granular material 16 from the liquid agent 15 and the contaminants 14. As the granular material 16, the liquid agent 15, and the contaminants 14 are conveyed upwardly away from the first opening 112 of the elongate housing 102 toward the second opening 114 of the elongate housing 102, the liquid agent 15 and contaminants 14 drain back down the elongate housing 102 toward the first opening 112. Accordingly, the granular material 16 is separated from the liquid agent 15 and the contaminants 14. The granular material 16 is conveyed toward the second opening 114 of the elongate housing 102 for discharge therefrom. The second opening 114 of the elongate housing 102 is positioned so as to drop cleaned granular material 16 at a desired location, such as, directly on the site 10 or into a bed of a dump truck (not shown). The cleaned granular material 16 is used to refill in site 10 or is removed on dump truck (not shown). In order to decrease the moisture content of the granular material 16 discharged from the second opening 114, the hydraulic cylinder 126 is actuated to increase the angular disposition of the elongate housing 102 relative to the mobile turntable 74.

As level L of the liquid agent 15 and the contaminants 14 within the chamber 80 rises to the level of the weir means 88, the addition of more slurry 18 to the chamber 80 from the inlet 76 results in the liquid agent 15 and the contaminants 14 flowing over the weir means 88 into the accumulator 90. The liquid agent 15 and the contaminants 14 are pumped from the accumulator 90 by the second pump means 92 through the second flexible pipe 100 into the filter trailer 73 to separate by filtering the contaminates 14 from the liquid agent 15. A flexible pipe 100A conducts the contaminates 14 and contaminated liquid agent 16 into the second tap 174 of the mobile reservoir tank 172 of the second tank truck 72. Non-contaminated liquid agent 15 is conducted through flexible pipe 100B back to the first tank 171. The second flexible pipe 100B recirculates the liquid agent 15 until the liquid agent 15 is ineffective to clean the granular material 16.

Figure 6:
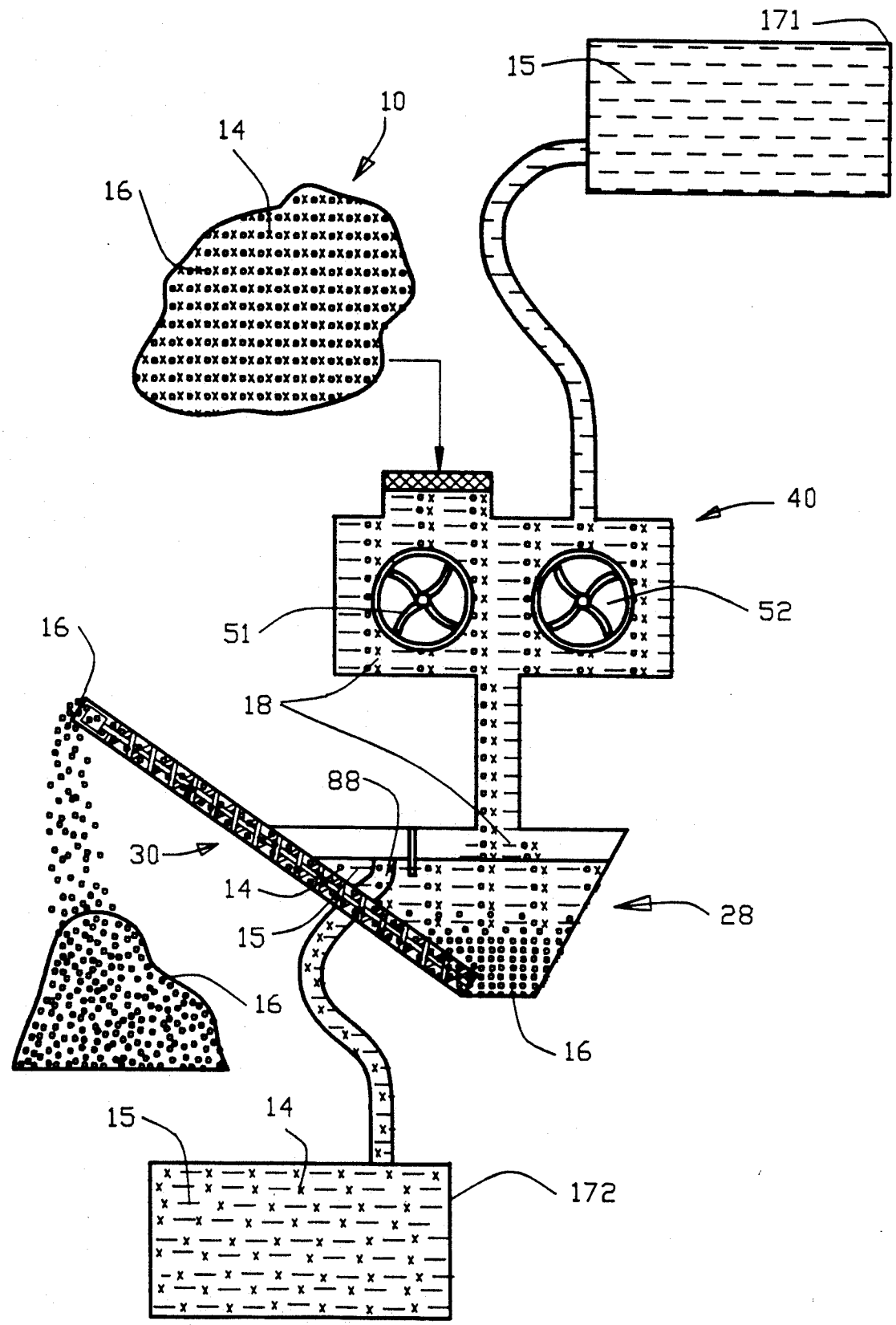
FIG. 6 is a diagrammatic representation of the process and apparatus of FIGS. 1-5 which summarizes the flow of the contaminants and the granular material through the apparatus.

FIG. 6 is a flow diagram which summarizes the flow through the mobile apparatus 8. The granular material 16 and the contaminants 14 are excavated from the site 10 and deposited into the processor 40. The liquid agent 15 is pumped from the first tank 171 into the processor 40. The granular material 16, the contaminants 14 and the liquid agent 15 are mixed by the first and second agitators 51 and 52. The contaminants 14 are separated from the granular material 16 in the slurry 18. The slurry 18 flows into the mobile reservoir 28 whereat the granular material 16 settles out of the slurry 18 while the contaminants 14 remain with the liquid agent 15. The separator means 30 conveys the granular material 16 upwardly while allowing the liquid agent 15 and the contaminants to drain back toward the mobile reservoir 28. The liquid agent 15 and the contaminants 14 drain from the mobile reservoir through the weir means 88 to be pumped into the second tank 172 for removal and disposal. Preferably, the granular material 16 is returned to the site 10.

The advantages of mobile apparatus 8 of the present invention include providing a method and an apparatus to remove contaminants 14 from a granular material 16 at a site 10 of contaminated granular material 16 without the need for removing the granular material 16 from the site 10. Until the present invention, the granular material 16 and the contaminants 14 had to be removed from the site 10 to a remote processing plant.

The present invention enables the granular material 16 to be cleaned on location by self-contained mobile equipment brought to the site 10. The present invention thus results in an operation which is less expensive, less time consuming, safer, less destructive to collateral resources, and generally more efficient than previous methods.

The present disclosure includes that contained in the appended claims as well as that of the foregoing description. Although this invention has been described in its preferred from with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A mobile apparatus for removing contaminants from a site containing granular material and the contaminants affixed thereto, utilizing a liquid agent, said apparatus comprising:

processor means for extracting at least a portion of the granular material and the contaminants affixed thereto from the site;

said processor means containing the liquid agent for separating the granular material from the contaminants affixed thereto, and creating a slurry comprising the granular material, the liquid agent and the contaminants;

said processor means having an output port;

conduit means in fluid tight communication with said output port of said processor means, said conduit means for conducting said slurry from said processor means;

mobile reservoir means having an inlet and an outlet, said inlet of said mobile reservoir means being connected to said conduit means for receiving said slurry from said processor means;

separation means having a first opening and a second opening, said first opening being disposed adjacent to and in fluid communication with said outlet of said mobile reservoir means, said separation means extending angularly relative to said mobile reservoir means for conveying the granular material, the liquid agent and the contaminants away from said first opening toward said second opening, for allowing the liquid agent and the contaminants to drain back toward said first opening, for thus separating the granular material from the liquid agent and the contaminants, and for conveying the seperated granular material toward said second opening for discharge therefrom; and discharge means in fluid communication with said mobile reservoir means for discharging the liquid agent and the contaminants from said mobile reservoir means.

2. An apparatus for removing contaminants from a site as set forth in claim 1, wherein said mobile reservoir means defines a chamber having opposed sloping sidewalls which slope toward each other from said inlet to said outlet such that as the granular material, the liquid agent and the contaminants enter said mobile reservoir means through said inlet, turbulent energy of the granular material, the liquid agent and the contaminants is rapidly dissipated permitting the granular material to settle toward said outlet.

3. An apparatus for removing contaminants from a site as set forth in claim 2, wherein said mobile reservoir means further includes:

weir means extending into said chamber for permitting the level of said slurry within said chamber to be limited;

accumulator means disposed between said weir means and said discharge means for accumulating the liquid agent and the contaminants without the granular material, said accumulator means having an entry port and an exit port, said entry port being in fluid communication with said weir means for permitting said slurry to flow from said weir means to said accumulator means;

a first flexible pipe extending between said exit port of said accumulator means and said discharge means; and a second flexible pipe extending from said discharge means to the basin for enabling said slurry to be discharged from said accumulator means.

4. An apparatus for removing contaminants from a site as set forth in claim 1, wherein said mobile reservoir means further includes:

a mobile turntable for permitting said mobile reservoir means to be rotated within a substantially horizontal plane such that said inlet of said mobile reservoir means is selectively positioned relative to the site; and pivotal means disposed between said mobile turntable and said mobile reservoir means such that said mobile reservoir means is selectively positioned angularly relative to said mobile turntable.

5. An apparatus for removing contaminants from a site as set forth in claim 1, wherein said separation means comprises an Archimedean screw conveyor.

6. An apparatus for removing contaminants from a site as set forth in claim 5, wherein said separation means further includes a hydraulic motor drivingly connected to said Archimedean screw conveyor for rotating said Archimedean screw conveyor.

7. An apparatus for removing contaminants from a site as set forth in claim 1, wherein the apparatus further includes:

a truck for rotatably supporting said mobile reservoir means and said separation means; and support means rigidly secured to said truck for releasably supporting said separation means relative to said truck.

8. An apparatus for removing contaminants from a site as set forth in claim 1, wherein said discharge means comprises a discharge pump in fluid communication with said mobile reservoir means for pumping the liquid agent and the contaminants from said mobile reservoir means.

9. An apparatus for removing contaminants from a site as set forth in claim 1, wherein the apparatus further includes disposal means in fluid communication with said discharge means for receiving the liquid agent and the contaminants from said mobile reservoir means, and for removing the liquid agent and the contaminants from the site.

10. A mobile apparatus for removing contaminants from a site containing granular material and the contaminants affixed thereto, utilizing a liquid agent, said apparatus comprising:

excavation means for extracting from the site and for conveying to the processor means at least a portion of the granular material and the contaminants affixed thereto;

chemical input means for adding liquid agent into processor means;

processor means having an input port and an output port, for receiving through said input port the granular material and the contaminants from said excavation means and the liquid agent from said chemical input means;

said processor means for separating the granular material from the contaminants affixed thereto, and creating a slurry comprising the granular material, the liquid agent and the contaminants;

conduit means in fluid tight communication with said output port of said processing means, said conduit means for conducting said slurry from said processor means;

mobile reservoir means having an inlet and an outlet, said inlet of said mobile reservoir means being connected to said conduit means for receiving said slurry from said processor means;

said mobile reservoir means defining a chamber having opposed sloping sidewalls which slope toward each other from said inlet to said outlet such that as said slurry enters said mobile reservoir means through said inlet, turbulent energy of the granular material, the liquid agent and the contaminants is rapidly dissipated permitting the granular material to settle toward said outlet;

an Archimedean screw conveyor for separating the granular material from the liquid agent and the contaminants, said Archimedean screw conveyor further including:

an elongate housing defining a first opening and a second opening, said first opening being disposed adjacent to and in fluid communication with said outlet of said mobile reservoir means, and said elongate housing extending angularly relative to said mobile reservoir means;

an elongate axle rotatably supported by and extending through and extending through and along the length of said elongate housing, said elongate axle having a first end and a second end, said first end of said elongate axle being disposed adjacent to said outlet of said mobile reservoir means;

spiral conveyor means rigidly secured to said elongate axle, said spiral conveyor means being disposed within said elongate housing and extending between said first opening and said second opening of said elongate housing such that when said elongate axle and spiral conveyor means rotate within said elongate housing, the granular material, the liquid agent and the contaminants are conveyed upwardly along said elongate housing from said first opening toward said second opening, the granular material continuing upwardly until discharged from said second opening and the liquid agent and the contaminants separating and flowing downwardly along said elongate housing toward said first opening;

discharge means in fluid communication with said mobile reservoir means for discharging the liquid agent and the contaminants from said mobile reservoir means, and disposal means in fluid communication with said discharge means for receiving the liquid agent and the contaminants from said mobile reservoir means, and for removing the liquid agent and the contaminants from the site.

11. An apparatus for removing contaminants from granular material as set forth in claim 10, wherein said processor means includes a filter screen for filtering the granular material and the contaminants received by said processor means through said input port from said excavation means.

12. An apparatus for removing contaminants from granular material as set forth in claim 10, wherein said input port of said processor means is in fluid communication with said chemical input means.

13. An apparatus for removing contaminants from granular material as set forth in claim 10, wherein said processor means comprises mechanical mixing means for mixing the granular material and the contaminants affixed thereto with the liquid agent.

14. An apparatus for removing contaminants from granular material as set forth in claim 10, wherein said conduit means comprises a slurry pump for pumping said slurry from said processor means to said mobile reservoir means.

15. An apparatus for removing contaminants from granular material as set forth in claim 10, wherein said elongate housing of said Archimedean screw conveyor is disposed at an angle of substantially 18° to the horizontal.

16. An apparatus for removing contaminants from a site as set forth in claim 10, wherein the apparatus further includes:

a truck for rotatably supporting said mobile reservoir means and said Archimedean screw conveyor; and support means rigidly secured to said truck for releasably supporting said elongate housing relative to said truck.

17. An apparatus for removing contaminants from granular material as set forth in claim 10, wherein said discharge means comprises a discharge pump in fluid communication with said mobile reservoir means for pumping the liquid agent and the contaminants from said mobile reservoir means.

18. An apparatus for removing contaminants from a site as set forth in claim 10, wherein said disposal means comprises a mobile container.

19. An on-site method of removing contaminants from a site containing granular material and the contaminants, using a mobile apparatus comprising processor means containing a liquid agent and having an output port, conduit means, mobile reservoir means having an inlet and an outlet, separation means having a first opening and a second opening, and comprising the steps of:

transporting mobile apparatus to the site;

connecting conduit means in fluid tight communication with the output port of the processor means;

connecting the conduit means to the inlet of the mobile reservoir means;

extracting at least a portion of the granular material and the contaminants affixed thereto from the site;

processing the granular material and the contaminants, such that the contaminants are separated from the granular material, and such that a slurry of the granular material, the liquid agent and the contaminants is formed and flows from the processor means through the conduit means toward the mobile reservoir means;

separating the granular material from the contaminants affixed thereto, and creating a slurry comprising the granular material, the liquid agent and the contaminants;

conducting the slurry from the processor means;

settling the granular material within the mobile reservoir means such that the granular material settles toward an outlet of the mobile reservoir means, the outlet being in fluid communication with a first opening of a separation means;

conveying the granular material, the liquid agent and the contaminants away from the first opening of the separation means toward the second opening of the separation means angularly relative to the mobile reservoir means so that the liquid agent and the contaminants drain back toward the first opening, and the granular material is separated from the liquid agent and the contaminants, and conveyed toward the second opening for discharge therefrom;

discharging the granular material from the second opening of the separation means; and discharging the liquid agent and the contaminants from the mobile reservoir means.

20. The method of claim 19, using an Archimedean screw conveyor, and further comprising the steps of:

separating the granular material from the liquid agent and the contaminants such that the separated granular material is conveyed angularly relative the mobile reservoir means by the Archimedean screw conveyor thereby permitting the granular material, the liquid agent and the contaminants to be conveyed away from a first opening of an elongate housing toward a second opening of the elongate housing, such that the liquid agent and the contaminants drain back toward the first opening and the granular material is separated from the liquid agent and the contaminants, and conveyed toward the second opening for discharge therefrom.

* * * * *